(12) United States Patent
Kitagawa

(10) Patent No.: US 7,641,239 B2
(45) Date of Patent: Jan. 5, 2010

(54) ASSEMBLY OF MALE AND FEMALE MEMBERS

(75) Inventor: Hiroyuki Kitagawa, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 80 days.

(21) Appl. No.: 11/918,479

(22) PCT Filed: Apr. 11, 2006

(86) PCT No.: PCT/JP2006/307643

§ 371 (c)(1),
(2), (4) Date: Oct. 15, 2007

(87) PCT Pub. No.: WO2006/112301

PCT Pub. Date: Oct. 26, 2006

(65) Prior Publication Data

US 2009/0026762 A1    Jan. 29, 2009

(30) Foreign Application Priority Data

Apr. 15, 2005    (JP) .............................. 2005-117828

(51) Int. Cl.
*F16L 21/035* (2006.01)
*F16L 17/02* (2006.01)
(52) U.S. Cl. ...................... 285/348; 285/108; 285/344; 285/347
(58) Field of Classification Search .................. 285/99, 285/108, 344, 347, 348, 375, 379
See application file for complete search history.

(56) References Cited

U.S. PATENT DOCUMENTS 3,273,919 A * 9/1966 Billeter et al. ............... 285/340

4,402,773 A * 9/1983 Morrill ......................... 285/25

(Continued)

FOREIGN PATENT DOCUMENTS

JP    11-315925    11/1999

(Continued)

OTHER PUBLICATIONS

Office Action issued Jan. 16, 2009 in corresponding Chinese application No. 2006800168788 (with English translation).

(Continued)

*Primary Examiner*—James M Hewitt
(74) *Attorney, Agent, or Firm*—Wenderoth, Lind & Ponack, L.L.P.

(57) ABSTRACT

The diameter of a front end opening section (20-1) extending rearward over a predetermined length from a front end opening of a male member reception hole (20) is larger than a diameter of a male member reception section (20-2) of the male member reception hole that follows the front end opening section. The backup ring (18) is allowed to engage an inner wall surface (20-3) of a front end opening section (20-1) as a backup ring (18) is pressed radially outward from an annular groove (24) by a seal ring (16) that is deformed by engagement with the inner wall surface of the male member reception hole (20) when a male coupling member (12) begins to be inserted into the male member reception hole (20), which prevents the backup ring (18) from coming out, in a radially outward manner, from the annular groove (24).

2 Claims, 6 Drawing Sheets

U.S. PATENT DOCUMENTS

| | | | |
|---|---|---|---|
| 2005/0023828 A1 | 2/2005 | Takeuchi et al. | |
| 2005/0046187 A1* | 3/2005 | Takeuchi et al. | 285/348 |
| 2006/0232066 A1* | 10/2006 | Kanagae et al. | 285/348 |
| 2007/0001450 A1* | 1/2007 | Swift et al. | 285/306 |

FOREIGN PATENT DOCUMENTS

| | | |
|---|---|---|
| JP | 2002-106763 | 4/2002 |
| JP | 2005-42815 | 2/2005 |

OTHER PUBLICATIONS

International Search Report (In English) of May 30, 2006 issued in the International Application No. PCT/JP2006/307643.

* cited by examiner

[Fig. 1] PRIOR ART
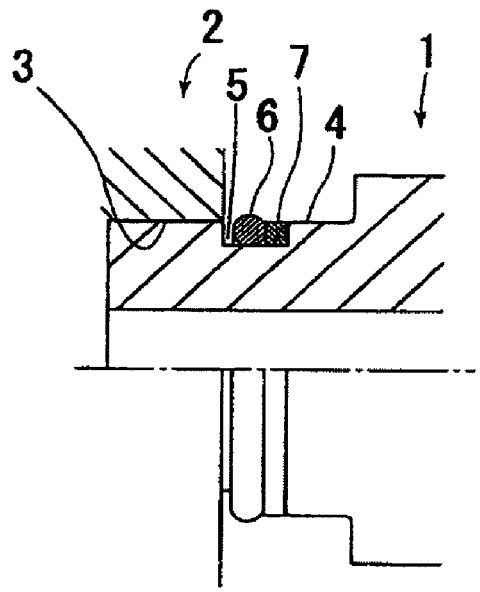
[Fig. 2] PRIOR ART
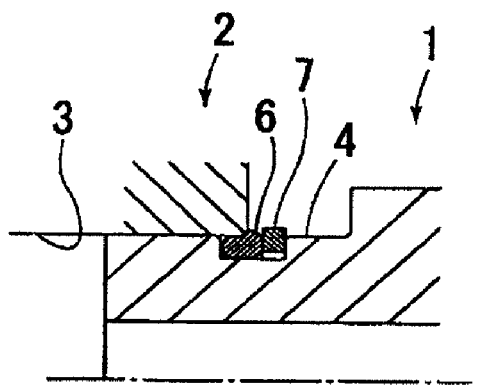
[Fig. 3] PRIOR ART
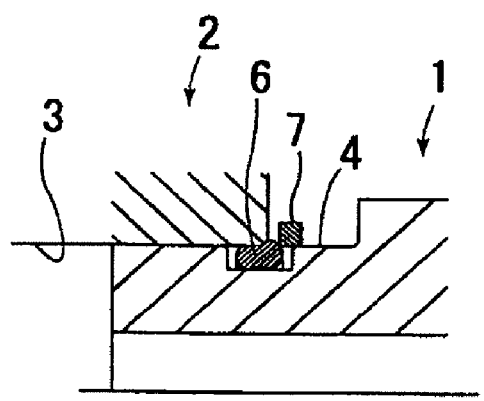

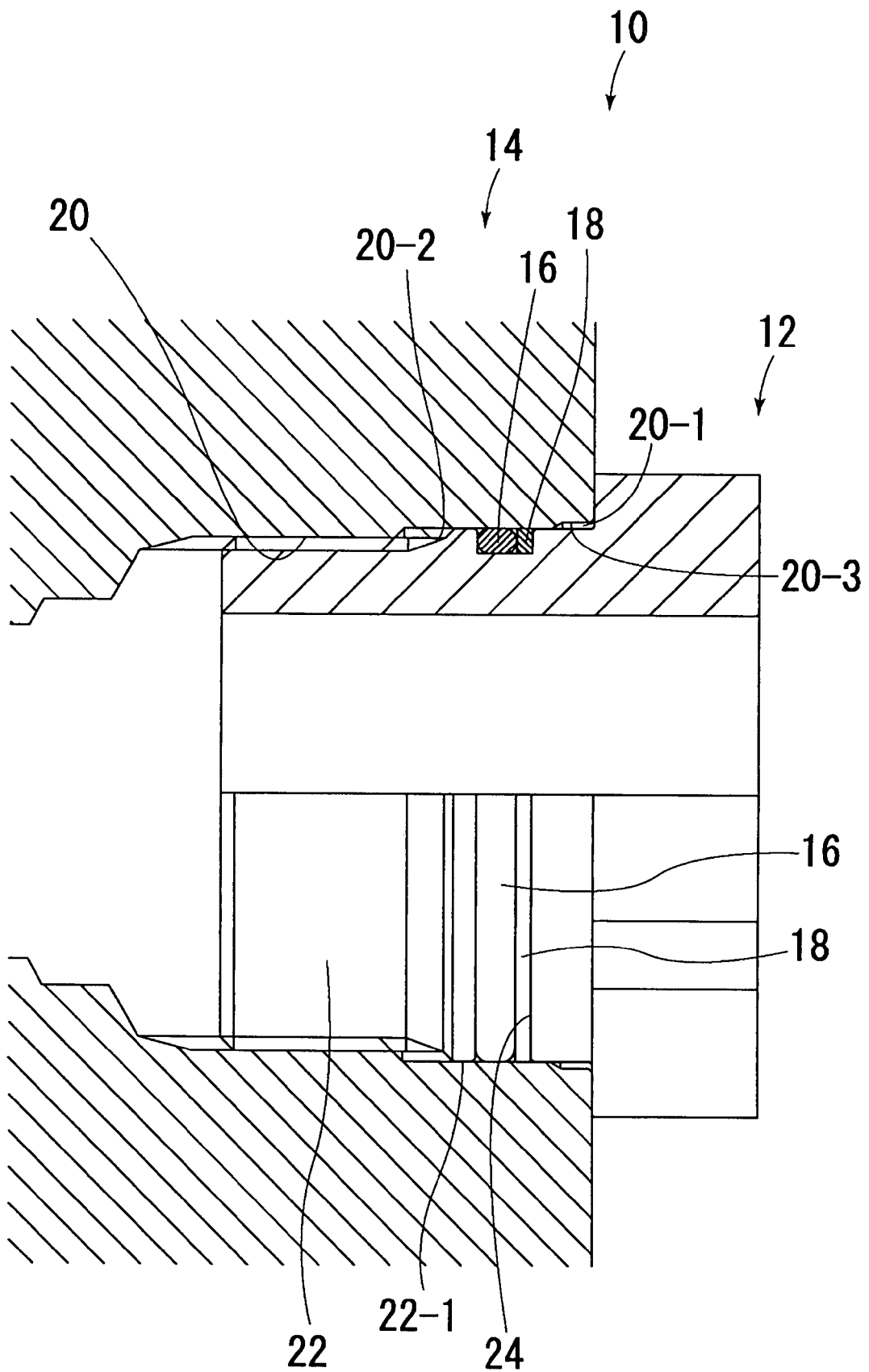
[Fig. 4]

[Fig. 5]
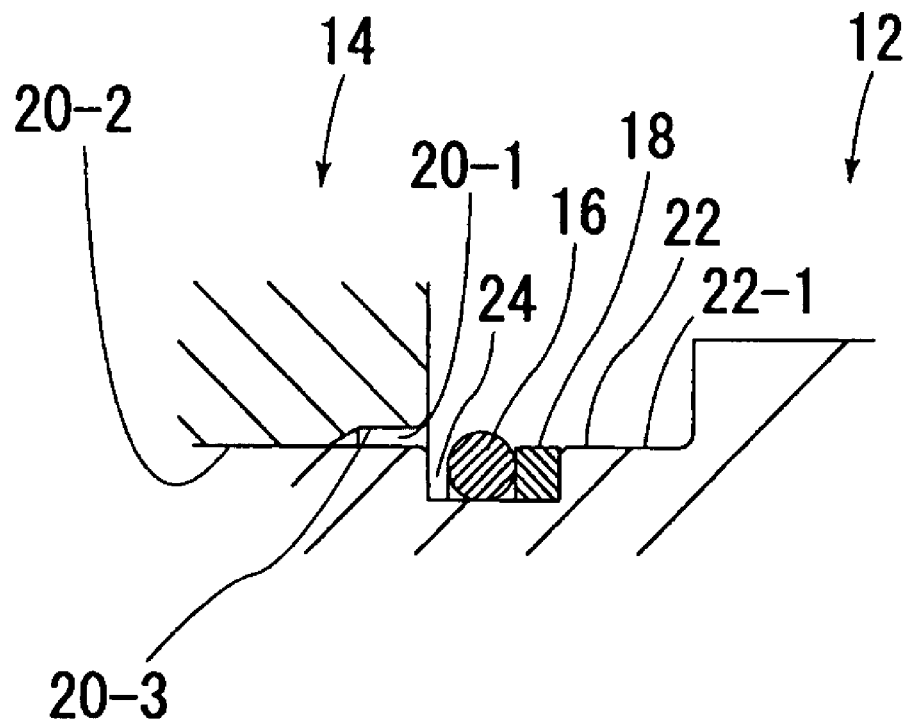
[Fig. 6]
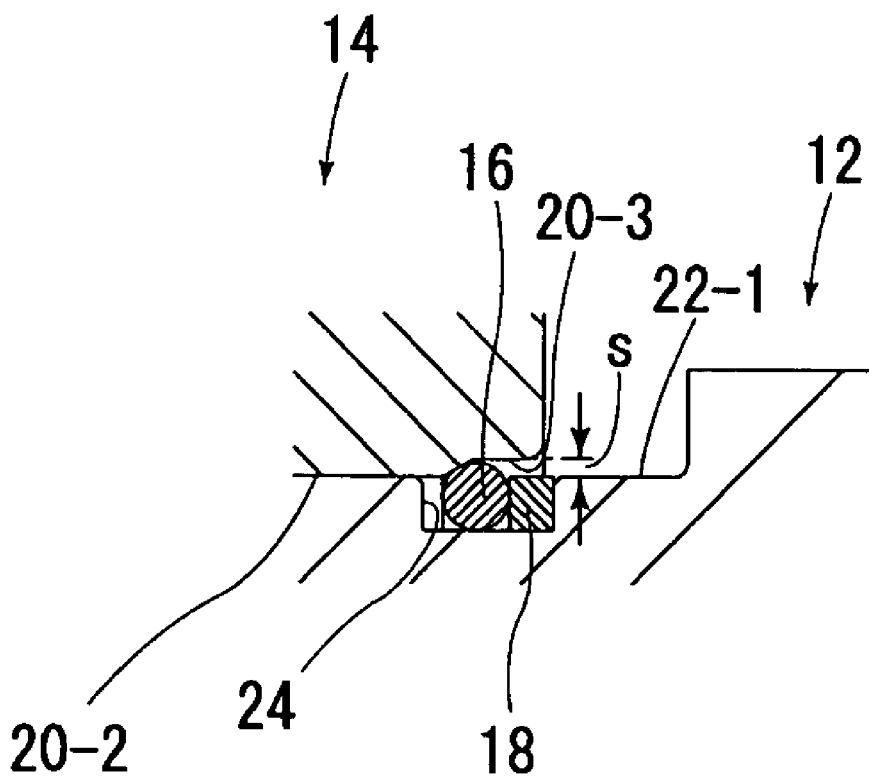

[Fig. 7]
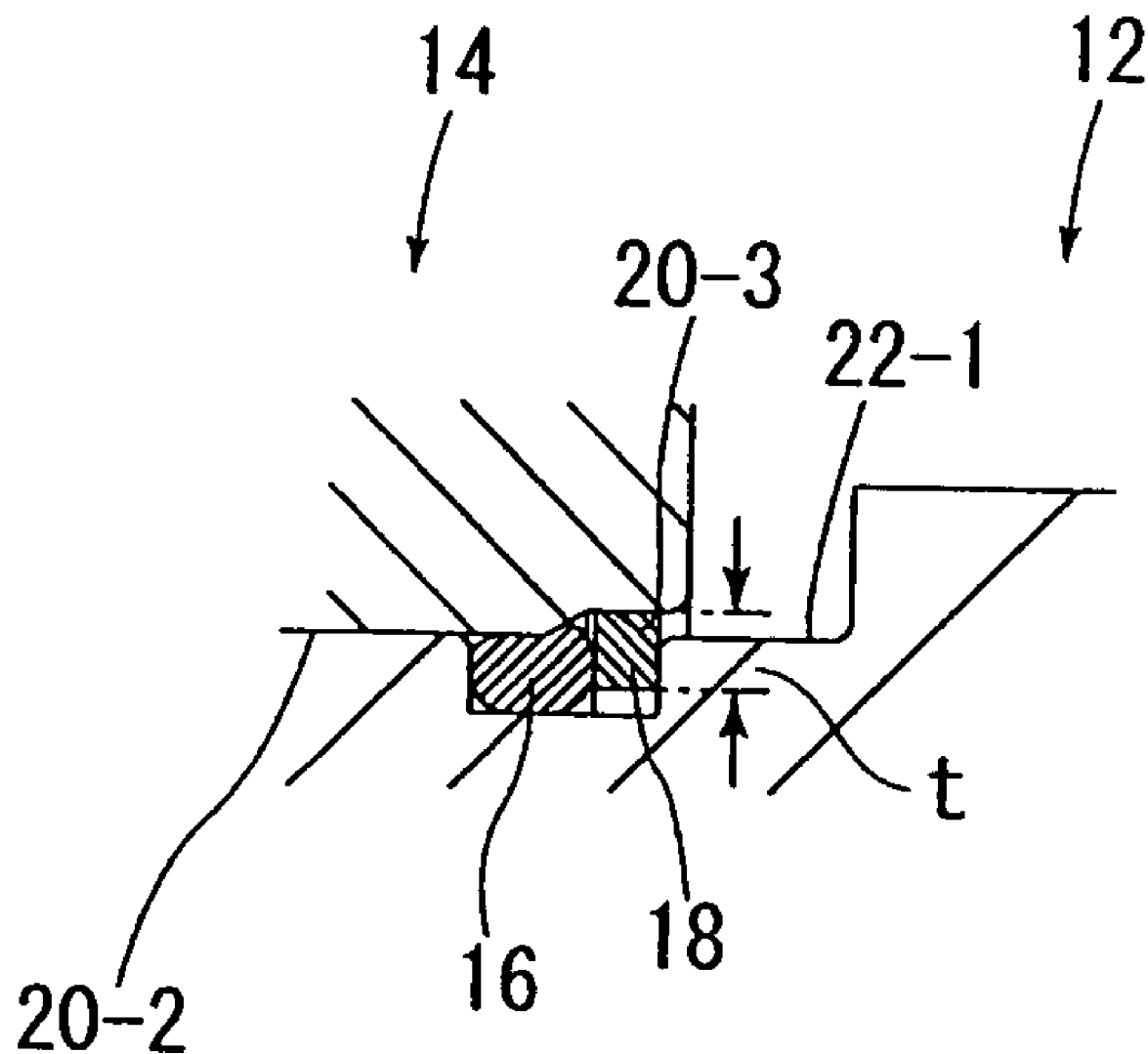

[Fig. 8]
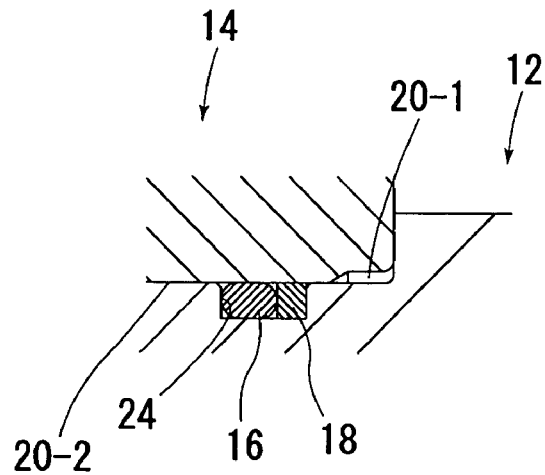
[Fig. 9]
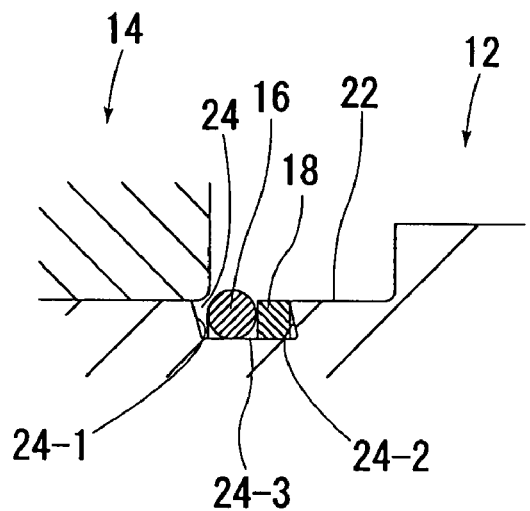
[Fig. 10]
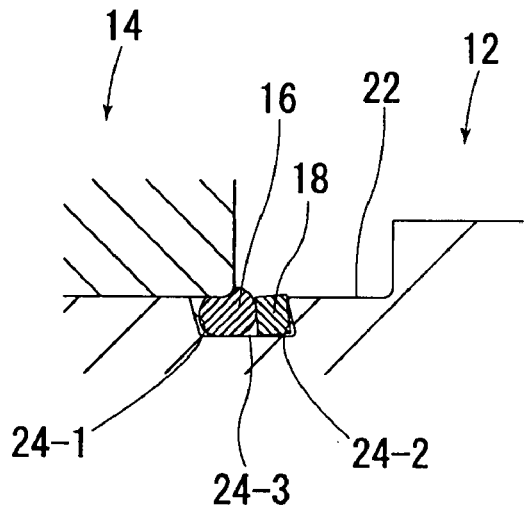

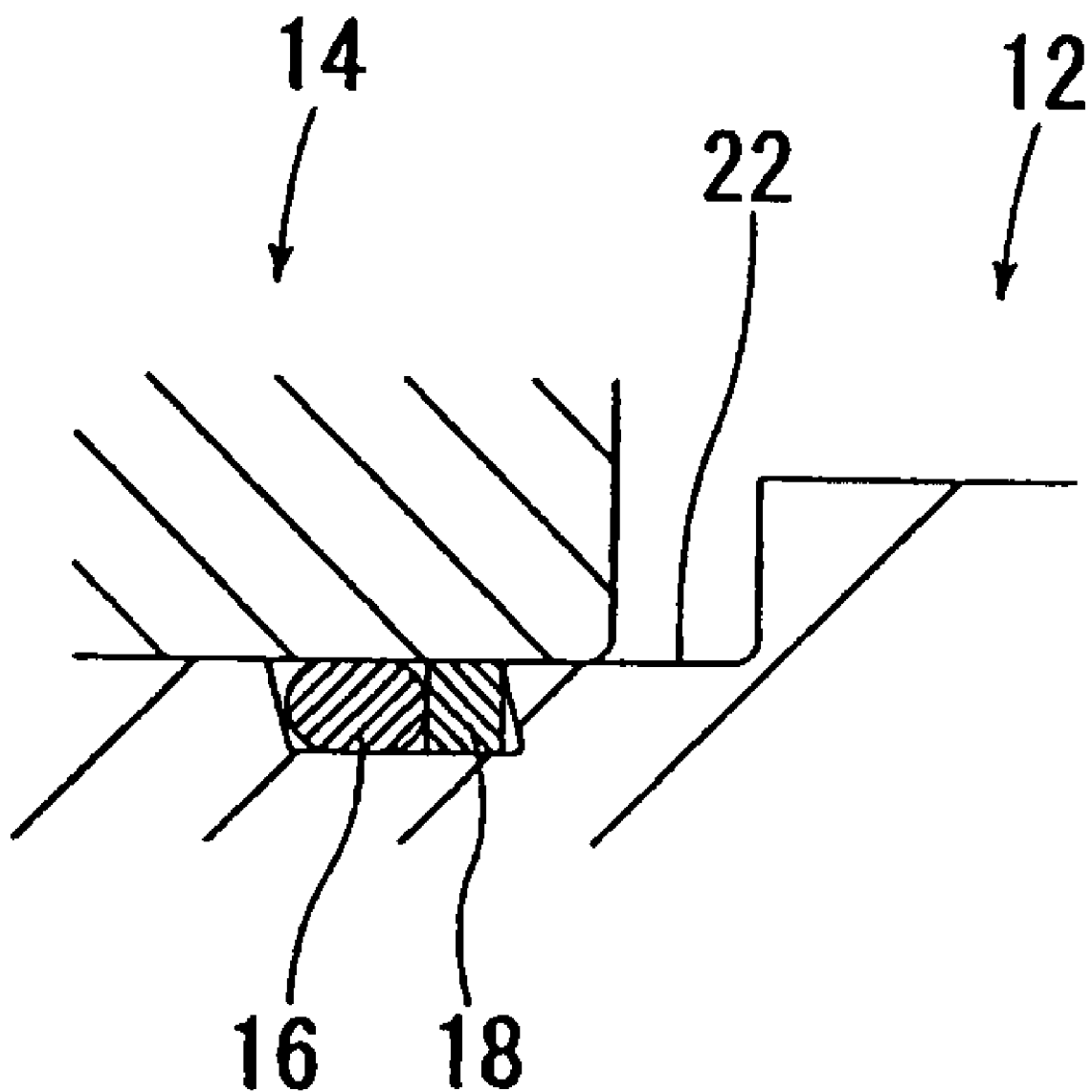
[Fig. 11]

ASSEMBLY OF MALE AND FEMALE MEMBERS

TECHNICAL FIELD

The present invention relates to a seal that is set between a male member subjected to a high-pressure fluid and a female member connected to the male member such as a male coupling member and a female coupling member of a pipe coupling used, for example, in a high-pressure fluid circuit.

BACKGROUND ART

In a pipe coupling used in a high-pressure fluid circuit, a seal ring and a backup ring that supports the seal ring are, generally, set between a male coupling member and a female coupling member to prevent leakage of a high-pressure fluid from therebetween in a state where the male coupling member has been inserted into and connected to the female coupling member (see Japanese Patent Application Publication No. 2005-42815).

There is a method of setting a seal ring and a backup ring wherein after the seal ring and the backup ring have been fitted in an annular groove formed on the outer peripheral surface of a male coupling member, the male coupling member is inserted into and connected to a female coupling member. This method suffers, however, from the following problem.

FIGS. 1 to 3 show an example of a way in which a male coupling member 1 is inserted into a female coupling member 2 in a conventional pipe coupling. The male coupling member 1 has an insert part 4 having substantially the same diameter as that of a male member reception hole 3 of the female coupling member 2. The insert part 4 has an annular groove 5 on the outer peripheral surface thereof. An elastic seal ring 6 and a backup ring 7 are set in the annular groove 5. The seal ring 6 is formed of a rubber or other material. The backup ring 7 is formed of a plastic or other material to have a relatively high rigidity. When the insert part 4 of the male coupling member 1 is inserted into the male member reception hole 3 of the female coupling member 2, the seal ring 6 is pressed between the inner wall surface of the male member reception hole 3 and the annular groove 5, causing the seal ring 6 to be elastically deformed to effect sealing.

The seal ring 6, however, is deformed by engagement with the end opening section of the male member reception hole 3 of the female coupling member 2 from the point of time when the insert part 4 of the male coupling member 1 begins to be inserted into the male member reception hole 3 of the female coupling member 2, and this causes the backup ring 7 to be pressed radially outward. The backup ring 7 is a split ring (i.e., a ring having a split, or cut, in a part thereof) to allow it to be inserted into the annular groove 5. Accordingly, if a radially outward pressure is applied to the backup ring 7 by the deformation of the seal ring 6, the backup ring 7 expands radially outward and may become outwardly dislodged from the annular groove 5 under certain circumstances before being inserted into the male member reception hole 3 (FIGS. 2 and 3).

DISCLOSURE OF THE INVENTION

The present invention has been made in view of the above-described circumstances. Accordingly, an object of the present invention is to make it possible to readily and reliably install a seal ring and a backup ring that are provided to effect sealing between a male member such as a male coupling member that is subjected to a high-pressure fluid and a female member such as a female coupling member that is connected to the male member.

That is, the present invention provides a female member of a male and female member assembly. The female member has a male member reception hole extending rearward from a front end opening thereof. The male member reception hole has a front end opening section extending rearward over a predetermined length from the front end opening, and a male member reception section extending rearward next to the front end opening section. The male member reception section has a diameter smaller than that of the front end opening section. A male member is adapted to be inserted into the male member reception hole from the front end opening. The male member has an outer peripheral surface that adjoins the inner wall surface of the male member reception section when the male member has been inserted into the male member reception hole. The male member further has an annular groove formed on the outer peripheral surface. A seal ring is fitted into the annular groove of the male member. The seal ring is pressed and deformed by the inner wall surface of the male member reception section to seal between the inner wall surface and the annular groove when the male member has been inserted into the male member reception hole. A backup ring is fitted into the annular groove in contact with the seal ring at a position closer to the front end opening of the male member reception hole than the seal ring when the male member has been inserted into the male member reception hole. When the backup ring is pressed and displaced radially outward from the annular groove by the seal ring that is deformed as the insertion of the male member into the male member reception hole progresses, the backup ring engages the inner wall surface of the front end opening section, thereby being prevented from becoming dislodged radially outward from the annular groove.

That is, in this female member, even if the backup ring is pressed to come out of the annular groove by deformation of the seal ring, the pressed backup ring is received in the front end opening section of the male member reception hole and retained by the inner wall surface of the front end opening section, thereby being prevented from becoming dislodged from the annular groove.

Specifically, the arrangement may be as follows. The front end opening section has a diameter larger than that of the seal ring as fitted in the annular groove, and the spacing between the inner wall surface of the front end opening section and the outer peripheral surface of the male member is smaller than the radial thickness of the backup ring.

With the above-described arrangement, the seal ring is inserted into the front end opening section without substantially encountering resistance and hence without being deformed. Even when the seal ring is inserted further rearward (inward) from the front end opening section and deformed to press the backup ring to come out of the annular groove, the inner wall surface of the front end opening section engages the backup ring. Thus, the backup ring can be prevented from becoming dislodged from the annular groove.

More specifically, the male member reception section and the front end opening section may be connected by a tapered surface extending from the inner wall surface of the front end opening section to the inner wall portion of the male member reception section.

In addition, the present invention provides a male member of a male and female member assembly including a female member having a male member reception hole. The male member is adapted to be inserted into the male member reception hole from a front end portion thereof. The male member has an outer peripheral surface that adjoins the inner wall surface of the male member reception hole when the male member has been inserted into the male member reception hole. The male member further has an annular groove formed on the outer peripheral surface. A seal ring is fitted into the annular groove of the male member. The seal ring is pressed and deformed by the inner wall surface of the male member reception hole to seal between the inner wall surface and the annular groove when the male member has been inserted into the male member reception hole. A backup ring is fitted into the annular groove in contact with the seal ring at a position rearward of the seal ring on the male member. The annular groove is defined by a front annular side wall surface and a rear annular side wall surface that are spaced from each other in the longitudinal direction of the male member, and a bottom wall surface extending between the front annular side wall surface and the rear annular side wall surface. The rear annular side wall surface is inclined forward of the male member from the bottom wall surface. When the backup ring is pressed radially outward from the annular groove by the seal ring that is deformed as the insertion of the male member into the male member reception hole progresses, the backup ring engages the rear annular side wall surface, thereby being prevented from becoming dislodged radially outward from the annular groove.

That is, in this male member, the rear annular side wall surface of the annular groove prevents a radially outward displacement of the backup ring and hence prevents the backup ring from becoming dislodged from the annular groove.

The present invention is applicable to a pipe coupling in which the male member is a male coupling member and the female member is a female coupling member.

In the female member according to the present invention, even if the backup ring is pressed to come out of the annular groove by deformation of the seal ring, the pressed backup ring is received in the front end opening section of the male member reception hole and retained by the inner wall surface of the front end opening section, thereby being prevented from becoming dislodged from the annular groove.

In the male member according to the present invention, the rear annular side wall surface of the annular groove is inclined forward, thereby preventing a radially outward displacement of the backup ring that would otherwise be caused by deformation of the seal ring when the male member is inserted into the female member, and thus preventing the backup ring from becoming dislodged from the annular groove.

BRIEF DESCRIPTION OF THE DRAWINGS

FIG. 1 is a fragmentary sectional view of a conventional pipe coupling, showing a state where a male coupling member has begun to be inserted into a female coupling member.

FIG. 2 is a fragmentary sectional view of the pipe coupling in FIG. 1, showing a state where the male coupling member has been further inserted into the female coupling member.

FIG. 3 is a fragmentary sectional view of the pipe coupling in FIG. 1, showing a state where the male coupling member has been even further inserted into the female coupling member (further than the position shown in FIG. 2).

FIG. 4 is a fragmentary sectional view of a pipe coupling according to the present invention.

FIG. 5 is a fragmentary sectional view of the pipe coupling in FIG. 4, showing a state where a male coupling member has begun to be inserted into a female coupling member.

FIG. 6 is a fragmentary sectional view showing a state where the male coupling member has been inserted into the female coupling member further than the position shown in FIG. 5.

FIG. 7 is a fragmentary sectional view showing a state where the male coupling member has been inserted into the female coupling member further than the position shown in FIG. 6.

FIG. 8 is a fragmentary sectional view of the pipe coupling in FIG. 4, showing a state where the insertion of the male coupling member into the female coupling member has been completed.

FIG. 9 is a fragmentary sectional view of a pipe coupling according to another embodiment of the present invention, showing a state where a male coupling member has begun to be inserted into a female coupling member.

FIG. 10 is a fragmentary sectional view showing a state where the male coupling member has been inserted into the female coupling member further than the position shown in FIG. 9.

FIG. 11 is a fragmentary sectional view showing a state where the male coupling member has been inserted into the female coupling member further than the position shown in FIG. 10.

DETAILED DESCRIPTION OF THE INVENTION

Embodiments of the present invention will be described below with reference to the accompanying drawings.

FIG. 4 shows a pipe coupling 10 to which the present invention is applied in a state where a male coupling member 12 and a female coupling member 14 are connected to each other. FIGS. 5 to 8 show the way in which a seal ring 16 and a backup ring 18 change when the male coupling member 12 is connected to the female coupling member 14.

The male coupling member 12 has an insert part 22 of substantially the same diameter as that of a male member reception hole 20 in the same way as in the foregoing conventional pipe coupling. The insert part 22 has an annular groove 24 formed on the outer peripheral surface 22-1 thereof. The seal ring 16 and the backup ring 18 are set in the annular groove 24.

The female coupling member 14 has a front end opening section 20-1 extending rearward over a predetermined length from the front end opening of the male member reception hole 20. The front end opening section 20-1 has a diameter larger than that of a male member reception section 20-2 of the male member reception hole 20 that follows the front end opening section 20-1.

In the illustrated example, the diameter of the front end opening section 20-1 is set slightly larger than the outer diameter of the seal ring 16 as fitted in the annular groove 24 of the insert part 22 of the male coupling member 12 and undeformed.

The front end opening section 20-1 has a predetermined axial length to allow the backup ring 18 to engage the inner wall surface 20-3 of the front end opening section 20-1 as the backup ring 18 is pressed radially outward from the annular groove 24 by the seal ring 16 deformed by engagement with the inner wall surface of the male member reception hole 20 when the male coupling member 12 has begun to be inserted into the male member reception hole 20, thereby preventing the backup ring 18 from coming out in a radially outward manner from the annular groove 24. In the illustrated example, the greater part of the backup ring 18 is located within the front end opening section 20-1 as the seal ring 16 set in the annular groove 24 of the male coupling member 12 begins to be forced into the male member reception section 20-2 of the male member reception hole 20.

Specifically, the diameter of the front end opening section 20-1 is set larger than the outer diameter of the seal ring 16 as fitted in the annular groove 24, as stated above. The spacing s (FIG. 6) between the inner wall surface 20-3 of the front end opening section 20-1 and the outer peripheral surface of the insert part 22 of the male coupling member 12 is set smaller than the radial thickness t (FIG. 7) of the backup ring 18.

In the illustrated example, a rearwardly tapered surface is provided to connect between the front end opening section 20-1 and the male member reception section 20-2 that follows it, thereby facilitating the entry of the seal ring 16 and the backup ring 18 into the male member reception section 20-2. The backup ring 18 is rigid. Therefore, the outer diameter of the backup ring 18 as fitted in the annular groove 24 is set smaller than the diameter of the male member reception section 20-2 to allow the backup ring 18 to be inserted into the male member reception section 20-2.

In the foregoing pipe coupling, when the insert part 22 of the male coupling member 12 is inserted into the male member reception hole 20 of the female coupling member 14, even if the seal ring 16 on the insert part 22 is deformed so as to press the backup ring 18 radially outward, the inner wall surface 20-3 of the front end opening section 20-1 restrains the radially outward movement of the backup ring 18, thereby allowing the backup ring 18 to be inserted into the male member reception hole 20, together with the seal ring 16.

FIGS. 9 to 11 show another embodiment of the pipe coupling according to the present invention.

In this pipe coupling, the annular groove 24 provided on the insert part 22 of the male coupling member 12 has a front annular side wall surface 24-1 and a rear annular side wall surface 24-2 that are inclined forward of the male coupling member 12 from a bottom wall surface 24-3 of the annular groove 24. That is, in this pipe coupling, the annular side wall surfaces of the annular groove 24, particularly the rear annular side wall surface 24-2, are inclined forward, whereby when the insert part 22 of the male coupling member 12 is inserted into the male member reception hole 20 of the female coupling member 14, even if the seal ring 16 is deformed so as to press the backup ring 18 radially outward, the rear annular side wall surface 24-2 restrains the radially outward movement of the backup ring 18 and thus prevents the backup ring 18 from becoming dislodged outward from the annular groove 24.

Although some embodiments of the present invention have been described above, the present invention is not necessarily limited to the described embodiments. For example, the diameter of the front end opening section in the first embodiment may be set smaller than the diameter of the seal ring. In this case, it is necessary to arrange such that even if the backup ring is pressed radially outward by the deformation of the seal ring, the backup ring enters the front end opening section before it is pushed out of the annular groove.

The invention claimed is:

1. A male and female member pipe coupling assembly comprising:
    a female member including a front end opening and a male pipe member reception hole extending rearward from the front end opening;
    a male member adapted to be inserted into the male pipe member reception hole from the front end opening, the male member including an outer peripheral surface and an annular groove formed on the outer peripheral surface;
    a seal ring fitted into the annular groove of the male member; and
    a backup ring fitted into the annular groove, such that the backup ring is in contact with the seal ring and is located at a position that is closer to the front end opening of the female member than the seal ring when the male member is inserted into the male member reception hole and the seal ring is pressed and deformed by an inner wall surface of the male member reception hole,
    wherein the male member reception hole includes a front end opening section extending rearward over a predetermined length from the front end opening of the female member,
    wherein the male member reception hole includes a male member reception section extending rearward in relation to the front end opening of the female member and being located rearward from and next to the front end opening section,
    wherein the front end opening section includes an inner wall surface having a diameter that is larger than a diameter of the seal ring as fitted in the annular groove of the male member, such that a spacing between the inner wall surface of the front end opening section and the outer peripheral surface of the male member is smaller than a radial thickness of the backup ring,
    wherein the male member reception section includes an inner wall surface that adjoins the outer peripheral surface of the male member when the male member has been inserted into the male member reception hole,
    wherein the inner wall surface of the male member reception section has a diameter that is smaller than the diameter of the seal ring as fitted in the annular groove, such that the seal ring is deformed as insertion of the male member into the male member reception hole progresses to advance the seal ring into the male member reception section and such that the seal ring presses the backup ring and displaces the backup ring radially outward from the annular groove,
    wherein, when the backup ring is displaced radially outward, the backup ring is engageable with the inner wall surface of the front end opening section while remaining in the annular groove such that the inner wall surface of the front end opening section prevents the seal ring from becoming dislodged radially outward from the annular groove, and wherein the male member reception section and the front end opening section are connected by a tapered surface extending from the inner wall surface of the front end opening section to the inner wall surface of the male member reception section.

2. The male and female member assembly of claim 1, wherein the male member reception section and the front end opening section are connected by a tapered surface extending from the inner wall surface of the front end opening section to the inner wall surface of the male member reception section.

* * * * *